United States Patent

Benoit et al.

[11] Patent Number: 5,448,041
[45] Date of Patent: Sep. 5, 1995

[54] PROCESS FOR THE ASSEMBLY OF AT LEAST TWO PARTS MADE FROM A COMPOSITE MATERIAL INCORPORATING A CERAMIC OR VITROCERAMIC MATRIX REINFORCED BY CERAMIC FIBRES

[75] Inventors: Joël. M. D. Benoit, Cesson La Foret; Gilles J.-M. Bessenay, Paris; Gérard P. Gauthier, Saint Michel sur Orge, all of France

[73] Assignee: Societe Nationale d'Etude et de Construction de Moteurs d'Aviation "SNECMA", Paris, France

[21] Appl. No.: 74,408

[22] Filed: Jun. 10, 1993

[30] Foreign Application Priority Data

Jun. 11, 1992 [FR] France ............... 92 07009

[51] Int. Cl.6 ............................... H05B 6/58
[52] U.S. Cl. ................ 219/768; 219/121.85; 219/638; 156/82
[58] Field of Search ........... 219/121.11, 121.6, 121.63, 219/121.64, 121.85, 129, 764, 765, 768, 770, 635, 633, 638, 645; 156/82, 89, 272.2, 273.9, 274.8; 428/594; 29/460

[56] References Cited

U.S. PATENT DOCUMENTS

| | | | |
|---|---|---|---|
| 3,559,210 | 2/1971 | Hansen | 428/911 |
| 4,338,380 | 7/1982 | Erickson et al. | 428/594 |
| 4,724,020 | 2/1988 | Ebata et al. | 156/82 |
| 4,861,407 | 8/1989 | Volkmann et al. | 219/121.65 |

FOREIGN PATENT DOCUMENTS

| | | |
|---|---|---|
| 0244993 | 11/1987 | European Pat. Off. . |
| 0375589 | 6/1990 | European Pat. Off. . |
| 1090721 | 11/1967 | United Kingdom . |
| 1586352 | 3/1981 | United Kingdom . |

OTHER PUBLICATIONS

Laser Und Optoelektronik, vol. 22, No. 4, Aug. 1990, pp. 75-79, H. K. Tohnshoff, et al., "Laser Welding of Technical Ceramic".

Primary Examiner—Bruce A. Reynolds
Assistant Examiner—Tu Hoang
Attorney, Agent, or Firm—Oblon, Spivak, McClelland, Maier & Neustadt

[57] ABSTRACT

A process for assembling at least two parts made from a composite material incorporating a ceramic or vitroceramic matrix reinforced by ceramic fibers. A continuous connection between these parts is achieved by approaching two of the parts along their respective edges to be assembled, forming a joint between the two parts by sewing with a tie or link of ceramic fibers from each of the parts to be assembled and heating the joints by a heating device employing a powerful and extremely localized heating until the two parts are welded together.

9 Claims, 2 Drawing Sheets

PROCESS FOR THE ASSEMBLY OF AT LEAST TWO PARTS MADE FROM A COMPOSITE MATERIAL INCORPORATING A CERAMIC OR VITROCERAMIC MATRIX REINFORCED BY CERAMIC FIBRES

BACKGROUND OF THE INVENTION

The invention relates to a process for the assembly of at least two parts made from a composite material incorporating a ceramic or vitroceramic matrix reinforced by ceramic fibers. Composite materials having ceramic or vitroceramic matrixes are being used with increasing frequency in the manufacture of parts simultaneously having to have a good resistance to high temperatures and a low weight. These materials are more particularly used in the manufacture of parts located in the hot areas of an aircraft turbo-jet engine. These parts are e.g. jet pipe flaps, reheat jet nozzle sleeves or arms, ferrules, collars, exhaust casing arms, blades or platforms for straighteners of a compressor or blades and mobile blade roots. These parts subject to stresses of a wide range of different types can break and it is then necessary to repair them.

Moreover, during the manufacture of large parts such as ferrules, it is frequently necessary to subdivide them into small individual components, bearing in mind the limits of installations used or the production processes and then assemble them (instead of carrying out an overall manufacture of the part).

The term "assembly process for two parts" therefore covers both cases referred to hereinbefore, i.e. not only the assembly, but also the repair of the parts.

The assembly of two or more parts made from the materials referred to hereinbefore causes problems if it is carried out by conventional mechanical means such as rivets, bolts or screws. Thus, mechanical assembly requires the drilling of the two parts to be assembled. However, it is difficult to machine ceramic composite materials as a result of their very great hardness and/or the presence of an anti-oxidation material layer on their surface or any other covering intended to protect the composite material. This covering tends to scale off or crack around the drill hole and therefore no longer fulfills its protective function against destructive external phenomena.

Moreover, when drilling takes place on a fiber-reinforced ceramic material, it has the effect of destroying a certain number of fiber strands, which reduces the mechanical strength of the part at said drill hole.

Finally, the presence of metal elements such as bolts or screws within the composite material part induces thermal expansion differences, which are prejudicial to the integrity of the assembly. It is therefore desirable to assemble the composite material parts with the aid of a material of the same type.

U.S. Pat. No. 4,353,966 describes a process for the joining of objects made from a composite material based on a glass matrix reinforced with carbon fibers. This process consists of applying to the surface of at least one of the two objects to be assembled, a glass mixture having a low softening point and a material with a high softening point and a low thermal expansion coefficient. The two objects are then assembled and hot compaction takes place.

U.S. Pat. No. 4,724,020 also discloses a process for the assembly of ceramic elements by heating and then applying a high voltage. More specifically, two torches are arranged on either side of the elements to be assembled and the contact line between the two elements is heated with the aid of these torches. A voltage between 1000 and 10,000 volts is then applied between these two torches. This process is applicable to ceramics conducting electricity at high temperature.

Finally, U.S. Pat. No. 4,156,051 discloses a process for the production of ceramic parts having complex shapes. These parts are e.g. the different elements of a turbine rotor. This process consists of producing a plurality of components of the final part by molding a ceramic material such as silicon nitride, aluminum nitride or silicon carbide, each component having a density above 98% of the theoretical value and a high bending strength. These components are then directly assembled with one another without intermediate foreign material by hot compaction. The bending strength of the joined parts is equal to that of the other parts of the component.

These processes are not suitable for the assembly of parts incorporating ceramic fiber reinforcements. Thus, during assembly, it is preferable to retain the continuity of the material at its junction for specific strength reasons.

SUMMARY OF THE INVENTION

The invention therefore relates to a process for the assembly of at least two parts made from a composite material incorporating a ceramic or vitroceramic matrix reinforced by ceramic fibers.

According to the invention, the process comprises approaching two of the parts along their respective edges to be assembled, producing a joint between these two parts by sewing with a tie or link ceramic fibers from each of the parts to be assembled and heating said joint by means permitting a powerful and extremely localized heating until the two parts are welded to one another.

It is also possible to produce the joint between the two parts by depositing powder of a ceramic or vitroceramic addition material around the sewn fibers.

This embodiment is more particularly usable in the case of a repair of two fragments from a broken part, in which each fragment still has at its broken free end in irregular manner pieces of ceramic fibers. It is then possible to sew these fibers and produce a joint from the same material as the part. The joint having the ceramic fibers maintains the continuity of the material at the junction of the two parts.

Advantageously, the ceramic fibers are chosen from among silicon carbide or alumina fibers.

Preferably, the material forming the ceramic or vitroceramic matrix is in powder form and is chosen from among ceramisable glasses of the lithium aluminosilicate, magnesium aluminosilicate, lithium and magnesium aluminosilicate, calcium aluminosilicate or magnesium and barium aluminosilicate types.

The invention is described in greater detail hereinafter relative to non-limitative embodiments and with reference to the attached drawings, wherein show:

DETAILED DESCRIPTION OF THE INVENTION

The assembly process according to the invention is specifically intended for the assembly of parts made from a composite material incorporating a ceramic or vitroceramic matrix reinforced by ceramic fibers. The materials used are advantageously in powder form, to which are added binders making it possible to maintain said powder and give consistency to the overall system. The ceramic or vitroceramic matrixes are e.g. chosen from among the materials referred to hereinbefore.

The ceramic fibers permitting the reinforcement of these materials are e.g. silicon carbide (SIC) fibers or alumina fibers ($Al_2O_3$).

The parts to be assembled can be constituted by ceramic/ceramic composite materials of the same or a different nature.

In addition, the architecture of the fibers of each part can be the same or different. For example, it can be formed from 0°/0° unidirectional sheets, which means that once the two parts are assembled, their respective fibers are parallel to one another. The orientation can also be 0°/90°, which means that the fibers of the two parts to be assembled are perpendicular to one another. It is also possible to have a 45°/45° orientation. However, these merely constitute the most frequently encountered orientation examples.

In addition, the stack of unidirectional sheets can combine the different possible orientations.

Other fiber architectures can be used, the most widely known being fabrics and 2.5 D textures. Unlike in the case of unidirectional sheets in plan, fabrics are formed from interwoven fibers. Among the fabrics it is e.g. possible to use taffeta, satin, serge or unbalanced fabric. These fabrics have various advantages, as a function of the orientation of the fibers forming them. Taffeta is easier to handle and satin deforms more easily, which makes it possible to use it for producing shape parts. Finally, it is also possible to orient these textures in such a way as to increase the number of fibers in the direction where the greatest stresses occur.

2.5 D textures are e.g. two-dimensional fabrics (2 D) with a connecting thread in the third direction in order to ensure a greater overall resistance and strength and mainly a connection between layers preventing separation from taking place.

In general terms, the process according to the invention consists of approaching the two parts to be assembled or repaired, along their respective edges to be assembled, forming between them a joint incorporating ceramic fibers, so as to ensure the continuity of the two parts, followed by the heating of the thus formed joint using means permitting a powerful and extremely localized heating until the two parts are sealed or welded together.

The joint incorporating the ceramic fibers can be formed in different ways.

Figure 1:
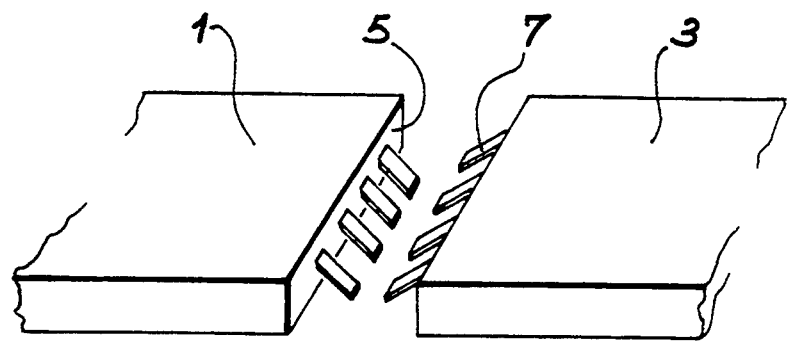
FIG. 1 a diagram illustrating two parts before their assembly.

FIG. 1 illustrates two parts 1 and 3 to be assembled, which have at their respective edges 5 to be assembled ceramic fiber fragments 7. These fibers are shown in arbitrary manner in a 45°/45° orientation.

Figure 2:
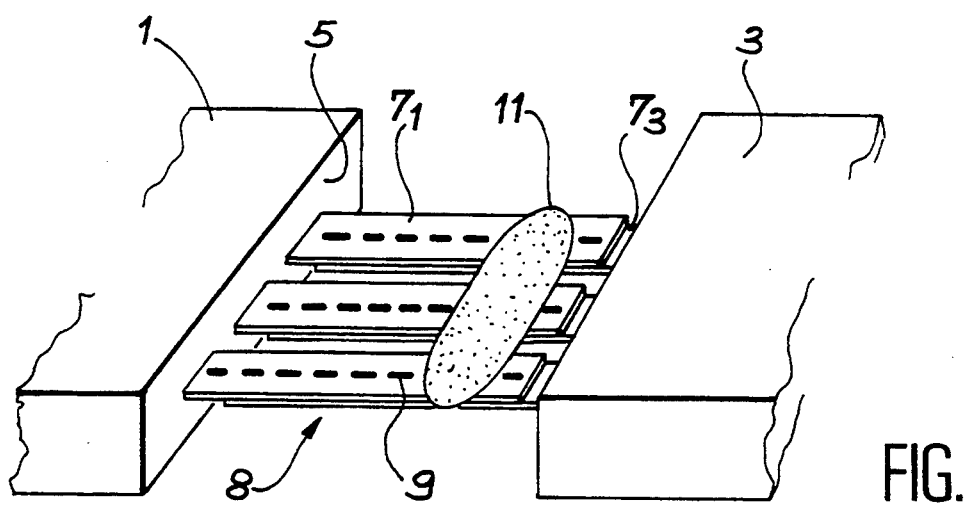
FIGS. 2 and 3 diagrams illustrating variants of the invention.

A first embodiment of the joint between these two parts is illustrated in FIG. 2. The two parts 1 and 3 respectively have fibers $7_1$ and $7_3$ projecting by their edge 5 to be assembled. The two parts 1 and 3 are moved together so that the projecting fibers $7_1$ of the part 1 cover the projecting fibers $7_3$ of the part 3. The joint 8 between the two parts is then made by sewing the fibers $7_1$ and $7_3$ or more specifically by stitching with the aid of a tie or link 9. Stitching ensures the maintaining of the fibers $7_1$, $7_3$ in the thickness. Preferably, said tie 9 is made from a fiber of the same type as those used in the matrixes of parts 1 and 3.

In a first variant of the first embodiment of the joint, localized heating is then directly carried out on the vitroceramic matrix of the parts 1 and 3 which, by remelting, form a joint between them.

In a second variant of the first embodiment, addition also takes place on either side of the thus formed seam, of a certain quantity of a powder of a ceramic or vitroceramic addition material 11 and local remelting takes place with the aid of the heating means described hereinafter, so as to form the joint 8 between the two parts 1 and 3. The addition material 11 is advantageously of the same type as the ceramic or vitroceramic matrix used for producing the assembled parts 1 and 3 (cf. the examples referred to hereinbefore). This addition material 11 is used when the gap to be filled between the two parts 1 and 3 is large, in other cases it is unnecessary.

Figure 3:
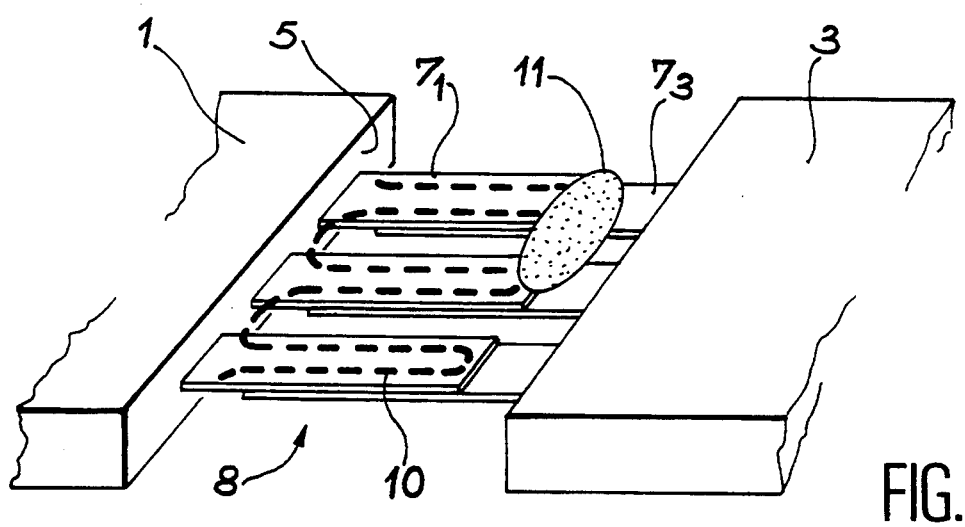

FIG. 3 illustrates a second embodiment of the joint between the parts 1 and 3. In a first variant of this second embodiment of the invention, the two parts are also assembled by sewing their fibers $7_1$ and $7_3$. However, in this case the tie is constituted by a long, continuous fiber 10 traversing the fibers $7_1$ and $7_3$ not only in the thickness, i.e. perpendicular to the fibers $7_1$, $7_3$, but also in the plane of the joint 8, i.e. that of the fibers $7_1$, $7_3$. This long fiber 10 is preferably made from a material of the same type as that used for the fibers of the matrixes. This is followed by localized heating of the fibers and the ends of the parts 1 and 3 in order to form the joint 8. In a second variant of the second embodiment, deposition then takes place on the fibers $7_1$ and $7_3$ of an addition material layer 11, as described hereinbefore relative to FIG. 2, and in this way the joint 8 is formed.

The heating means used must be able to introduce a very large energy quantity in a small volume, in order to obtain in a very localized manner a remelting of the addition material and a rediffusion towards the material of the matrix constituting the parts.

Figure 5:
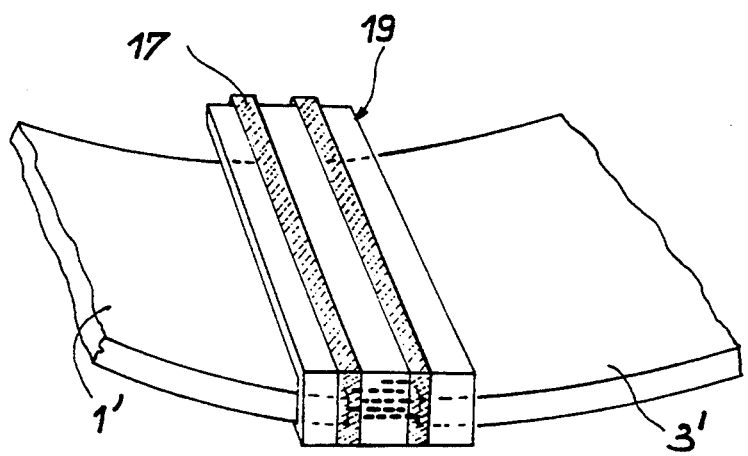
Figure 6:
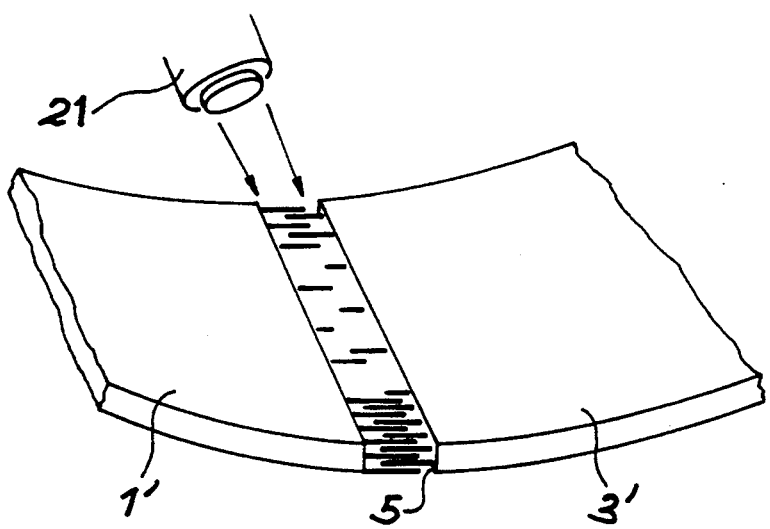

Among said heating means, reference can e.g. be made to microwave heating with the aid of a 2.45 GHz cavity resonator (cf. FIG. 4), induction heating, generally with a susceptor (cf. FIG. 5), infrared lamp heating (not shown) or surface treatment using a laser beam (cf. FIG. 6). The heating means will be chosen as a function of the geometry of the parts and the nature of the joints to be made.

Figure 4:
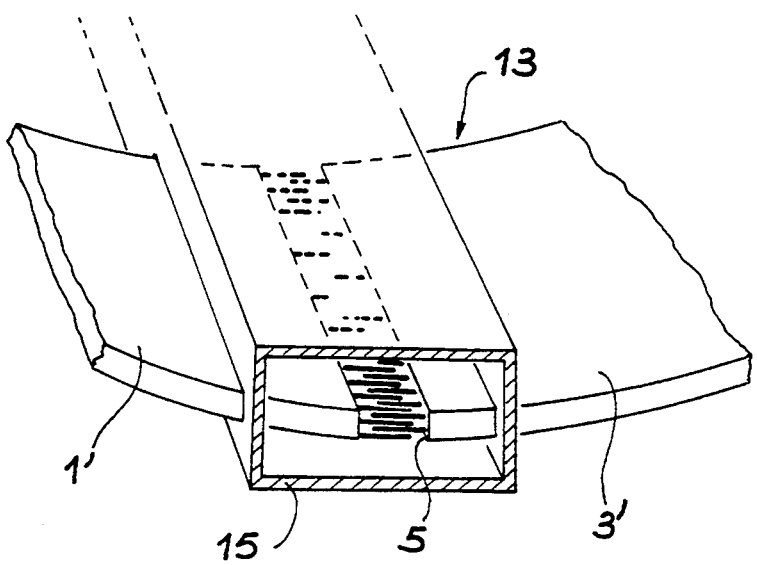
FIGS. 4, 5 and 6 diagrammatically various heating procedures used in the process according to the invention.

As illustrated in FIG. 4, two parts 1' and 3' of a ferrule 13 are assembled in a cavity resonator 15. The fiber assembly procedure is that used in FIGS. 2 and 3.

FIG. 5 is similar to FIG. 4, except that heating takes place with the aid of an inductor 17 and a susceptor 19.

Finally, FIG. 6 illustrates the heating of the two parts 1',3' by a laser beam 21.

The use of these very localized heating means makes it possible not to have to introduce melting agents into the addition material, which would lower the melting point by an overall treatment. Instead the addition material can be constituted by a material identical to that used for producing the parts. The main interest of the procedure according to the invention is that it does not limit the assembly use temperature to the melting point of an addition material with melting agents (lower than that of the original matrix). This localized heating makes it possible to even work on parts incorporating metal components or composite elements whose melting point is lower than that of the main material.

Finally, it should be noted that although reference has always been made to the assembly of two parts, it is also possible to assemble a larger number of parts simultaneously.

We claim:

1. A process for assembling at least two parts made from a composite material incorporating a ceramic or vitro-ceramic matrix reinforced by ceramic fibers, comprising the steps of
   a) approaching of two of the parts along their respective edges to be assembled,
   b) forming a joint between said two parts by sewing ceramic fibers from each of the parts to be assembled with a tie and
   c) heating said joint by a heating device permitting a powerful and extremely localized heating until the two parts are welded together.

2. A process according to claim 1, characterized in that sewing takes place by stitching with an aid of a tie maintaining the fibers in a thickness.

3. A process according to claim 1, characterized in that sewing is performed with an aid of a tie to ensure maintaining of the fibers in a thickness and in a plane of said fibers.

4. A process according to claims 1, 2 or 3, characterized in that the joint is formed between the two parts by depositing powder of a ceramic or vitroceramic as an additional material around the fibers, said fibers being sewn.

5. Process according to claim 1, characterized in that said ceramic or vitroceramic matrix is chosen from ceramisable glasses consisting of lithium aluminosilicate, magnesium aluminosilicate, lithium and magnesium aluminosilicate, calcium aluminosilicate, magnesium and barium aluminosilicate types.

6. Process according to claim 4, characterized in that the additional material is of the same type as the ceramic or vitroceramic matrix.

7. Process according to claim 1, characterized in that the ceramic fibers are chosen from a group consisting of silicon carbide and alumina fibers.

8. Process according to claims 2 or 3, characterized in that the tie is made from the same material as the ceramic fibers.

9. Process according to claim 1, characterized in that the heating device 10 chosen from a group consisting of microwave heating, induction heating, infrared emission lamps, and laser beam.

* * * * *

UNITED STATES PATENT AND TRADEMARK OFFICE
CERTIFICATE OF CORRECTION

PATENT NO. : 5,448,041
DATED : September 5, 1995
INVENTOR(S) : Joel M.D. BENOIT, et al.

It is certified that error appears in the above-indentified patent and that said Letters Patent is hereby corrected as shown below:

On the title page, Item [54], and Column 1, Line 6, "FIBRES" should be changed to read:

--FIBERS--

Signed and Sealed this

Twenty-sixth Day of December, 1995

Attest:

BRUCE LEHMAN

*Attesting Officer*  *Commissioner of Patents and Trademarks*